US008036597B2

(12) United States Patent
Rahman et al.

(10) Patent No.: US 8,036,597 B2
(45) Date of Patent: Oct. 11, 2011

(54) METHOD AND APPARATUS FOR DETERMINING A LEVEL OF INVOLVEMENT OF MESH POINTS IN A WIRELESS COMMUNICATION SYSTEM

(75) Inventors: Shamim Akbar Rahman, Montreal (CA); Juan Carlos Zuniga, Montreal (CA); Marian Rudolf, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 811 days.

(21) Appl. No.: 11/393,302

(22) Filed: Mar. 29, 2006

(65) Prior Publication Data

US 2006/0248385 A1 Nov. 2, 2006

Related U.S. Application Data

(60) Provisional application No. 60/667,718, filed on Apr. 1, 2005.

(51) Int. Cl.
*H04B 7/00* (2006.01)
(52) U.S. Cl. .................. 455/41.2; 455/517; 370/338
(58) Field of Classification Search .............. 370/235, 370/254, 329, 338, 348, 351, 392, 400, 477, 370/331–332, 401; 455/422.1, 436–437, 455/439, 442, 41.2, 517
See application file for complete search history.

(56) References Cited

U.S. PATENT DOCUMENTS

| 4,012,597 A | 3/1977 | Lynk, Jr. et al. |
|---|---|---|
| 5,832,298 A | 11/1998 | Sanchez et al. |
| 6,026,303 A | 2/2000 | Minamisawa |
| 6,704,283 B1 * | 3/2004 | Stiller et al. .................. 370/238 |
| 6,778,502 B2 * | 8/2004 | Ricciulli ........................ 370/238 |
| 6,862,622 B2 | 3/2005 | Jorgensen |
| 7,215,638 B1 * | 5/2007 | Roberts et al. ................ 370/231 |
| 7,433,702 B2 | 10/2008 | Lindskog et al. |
| 7,724,671 B2 * | 5/2010 | Midtun et al. ................. 370/236 |
| 2002/0018478 A1 | 2/2002 | Takeyama et al. |
| 2002/0154622 A1 * | 10/2002 | Hammel et al. .............. 370/348 |
| 2002/0191596 A1 | 12/2002 | Moyano et al. |
| 2003/0087629 A1 * | 5/2003 | Juitt et al. ..................... 455/411 |

(Continued)

FOREIGN PATENT DOCUMENTS

WO 2004/109474 12/2004

(Continued)

OTHER PUBLICATIONS

Bates, Stephen, "On Edges and Connectivity in Ad Hoc Networks:" Global Telecommunications Conference, 2004. GLOBECOM'04. IEEE vol. 6, Nov. 29-Dec. 3, 2004, pp. 3588-3593 vol. 6.

(Continued)

*Primary Examiner* — Dwayne Bost
*Assistant Examiner* — Inder Mehra
(74) *Attorney, Agent, or Firm* — Volpe and Koenig, P.C.

(57) ABSTRACT

In a wireless communication system comprising a plurality of mesh points (MPs), a method for determining a level of involvement of MPs within the system includes a first MP transmitting a network status request signal to a second MP. The second MP responds to the first MP with network status information. The first MP receives the network status information from the second MP, and determines a level of involvement in the wireless system based on the network status information.

10 Claims, 5 Drawing Sheets

U.S. PATENT DOCUMENTS

| | | | |
|---|---|---|---|
| 2003/0204587 A1 | 10/2003 | Billhartz | |
| 2004/0162027 A1 | 8/2004 | Chang | |
| 2004/0190454 A1* | 9/2004 | Higasiyama | 370/238 |
| 2004/0213274 A1* | 10/2004 | Fan et al. | 370/401 |
| 2004/0242230 A1 | 12/2004 | Rue | |
| 2004/0257995 A1 | 12/2004 | Sandy et al. | |
| 2005/0065743 A1* | 3/2005 | Cumming et al. | 702/62 |
| 2005/0096094 A1 | 5/2005 | Kim et al. | |
| 2007/0049293 A1 | 3/2007 | Russell | |
| 2007/0110036 A1 | 5/2007 | Lang | |
| 2007/0258508 A1* | 11/2007 | Werb et al. | 375/140 |

FOREIGN PATENT DOCUMENTS

| | | |
|---|---|---|
| WO | 2004/114690 | 12/2004 |

OTHER PUBLICATIONS

"Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking" IEEE P802. 11s/D0.01, Mar. 2006.

Hu, Yih-Chun, et al., "Exploiting Congestion Information in Network and Higher Layer Protocols in Multihop Wireless Ad Hoc Networks;" Distributed Computing Systems, 2004. Proceedings. 24$^{th}$ International Conference on Distributed Computing Systems (ICDCS'04), 2004, pp. 301-310.

"Information Technology—Telecommunications and information exchange between systems—Local and Metropoitan area networks—Specific Requirements—Part 11: Wireless LAN Medium Access Control (MAC) and Physical Layer (PHY) Specifications;" Reaffirmed Jun. 12, 2003. ANSI/IEEE Std. 802.11, 1999 Edition (R2003).

Kitahara, Takeshi, et al., "An Adaptive Load Balancing in Multi-hop Mesh Networks for Broadband Fixed Wireless Access Systems;" Radio and Wiireless Conference, 2004 IEEE, Sep. 19-22, 2004, pp. 463-466.

Tassiulas, Leandros, et al., "Maxmin Fair Scheduling in Wireless Networks;" INFOCOM 2002. Twenty-First Annual Joint Conference of the IEEE Computer and Communications Societies, Proceedings. IEEE, vol. 2, Jun. 23-27, 2002, pp. 763-772 vol. 2.

Kitahara, Takeshi et al. "An Adaptive Load Balancing in Multi-hop Mesh Networks for Broadband Fixed Wiireless Access Systems;" Radio and Wireless Conference, 2004 IEEE, Sep. 19-22, 2004, pp. 463-466.

Hu, Yih-Chun et al. "Exploiting Congestion Information in Network and Higher Layer Protocols in Multihop Wireless Ad Hoc Networks;" Distributed Computing Systems, 2004. Proceedings. 24$^{th}$ International Conference on Distributed Computing Systems (ICDCS'04), 2004, pp. 301-310.

Tassiulas, Leandros et al. "Maxmin Fair Scheduling in Wireless Networks;" INFOCOM 2002. Twenty-First Annual Joint Conference of the IEEE Computer and Communications Societies, Proceedings. IEEE, vol. 2, Jun. 23-27, 2002, pp. 763-772 vol. 2.

Bates, Stephen "On Edges and Connectivity in Ad Hoc Networks;" Global Telecommunications Conference, 2004. GLOBECOM'04. IEEE vol. 6, Nov. 29-Dec. 3, 2004, pp. 3588-3593 vol. 6.

"Information Technology—Telecommunications and information exchange between systems—Local and metropolitan area networks—Specific Requirements—Part 11: Wireless LAN Medium Access Control (MAC) and Physical Layer (PHY) Specifications;" Reaffirmed Jun. 12, 2003. ANSI/IEEE Std. 802.11, 1999 Edition.

"Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking" IEEE P802.11s/D0.01, Mar. 2006.

Bates, Stephen, "On Edges and Connectivity in Ad Hoc Networks:" Global Telecommunications Conference, 2004. GLOBECOM'04. IEEE vol. 6, Nov. 29-Dec. 3, 2004, pp. 3588-3593 vol. 6.

* cited by examiner

METHOD AND APPARATUS FOR DETERMINING A LEVEL OF INVOLVEMENT OF MESH POINTS IN A WIRELESS COMMUNICATION SYSTEM

CROSS REFERENCE TO RELATED APPLICATIONS

This application claims the benefit of U.S. Provisional Application No. 60/667,718 filed Apr. 1, 2005, which is incorporated by reference herein as if fully set forth.

FIELD OF INVENTION

The present invention relates to wireless communication systems. In particular, the present invention relates to a method and apparatus for determining a level of involvement of mesh points in a wireless communication system.

BACKGROUND

Wireless local area networks (WLANs) are becoming more widespread as wireless technology continues to become more advanced, and variations of wireless networks may exist. For example, a traditional WLAN might be based on a structured system that includes a base station which communicates with wireless devices and routes traffic between them. Another type of wireless network is an ad-hoc network, in which a wireless device communicates with one or more additional wireless devices in a point-to-point technique where wireless devices dynamically connect to, and disconnect from, the network.

As a combination of the traditional WLAN and ad-hoc network, a mesh network may include user devices, terminals, access points (APs), and base stations, which all function as mesh points (MPs). Mesh networks have been garnering increasing support in the standards community due to characteristics such as low-effort coverage extension for WLANs, low-effort and low-complexity self-deploying WLANs, and for their high fault-tolerance and redundancy.

One characteristic of a mesh network is that MPs within the network may perform various network functions that were traditionally only performed by one particular type of wireless device within a network. As a result, MPs that are not normally utilized for particular functions may become strained by suddenly being expected to perform these additional functions. For example, a wireless device that is not normally expected to perform routing or forwarding from one device to another may experience an excessive drain on its power supply or battery when routing or forwarding from one MP to another, thereby limiting the device's functionality and useful life.

Accordingly, there is a need to control the MPs that participate in the mesh network from both the MP user's and the mesh network operator's perspective, that are not subject to the limitations of conventional methods.

SUMMARY

In a wireless communication system comprising a plurality of mesh points (MPs), a method and apparatus for determining a level of involvement of MPs within the system includes a first MP transmitting a network status request signal to a second MP. The second MP responds to the first MP with the network status information. The first MP receives the network status information from the second MP, and determines a level of involvement in the wireless system based on the network status information.

BRIEF DESCRIPTION OF THE DRAWINGS

The foregoing summary, as well as the following detailed description of the preferred embodiments of the present invention will be better understood when read with reference to the appended drawings, wherein.

DETAILED DESCRIPTION OF THE PREFERRED EMBODIMENT(S)

Hereafter, the terminology "mesh point" (MP) refers to a wireless transmit/receive unit (WTRU), a user equipment (UE), a mobile station, a fixed or mobile subscriber unit, a pager, or any other type of device capable of operating in a wireless environment. Additionally, an MP may refer to a base station, a Node-B, a site controller, an access point or any other type of interfacing device in a wireless environment.

The features of the present invention may be incorporated into an integrated circuit (IC) or be configured in a circuit comprising a multitude of interconnecting components.

Figure 1:
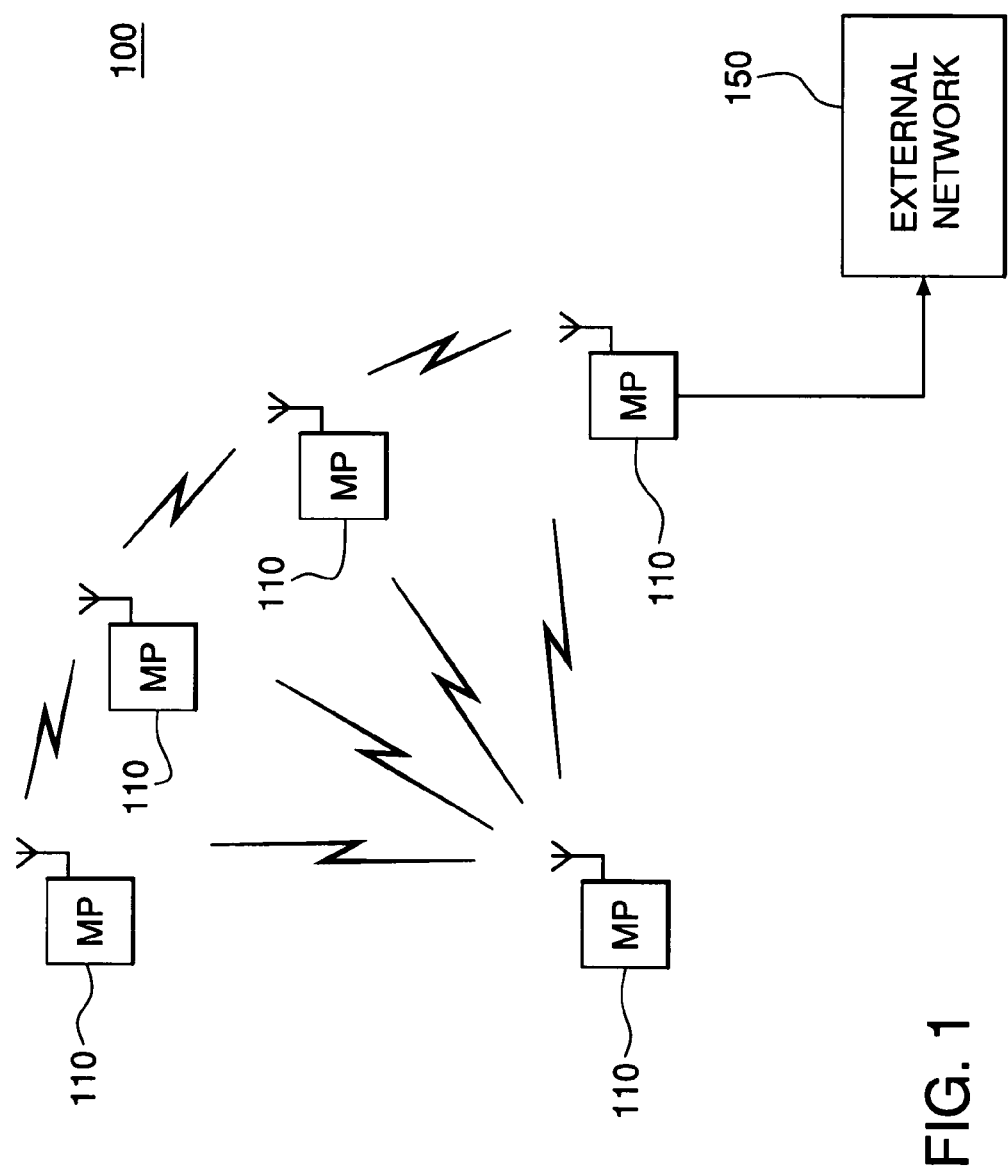
FIG. 1 shows a wireless communication system configured in accordance with the present invention.

FIG. 1 shows a wireless communication system 100 configured in accordance with the present invention. The wireless communication system 100 includes a plurality of MPs 110, capable of communicating with one another. In addition, one or more of the MPs 110 may be connected to an external network 150, such as the Internet, a public switched telephone network (PSTN), or any other type of external network. In this manner, any MP 110 in the wireless communication system 100 may have access to the external network 150 through the MP 110 connected to the external network 150. For purposes of example, only one MP 110 is depicted in FIG. 1 as connected to the external network 150. However, any number of MPs 110 may be connected to the external network 150.

For purposes of describing the present invention, the phrase "level of involvement" referes to the level of involvement MPs have with respect to a wireless communication system in which they are operating. As described in more detail below, the level of involvement is preferably based on status information regarding the system or network in which an MP is operating, and in particular the network status information.

Figure 2:
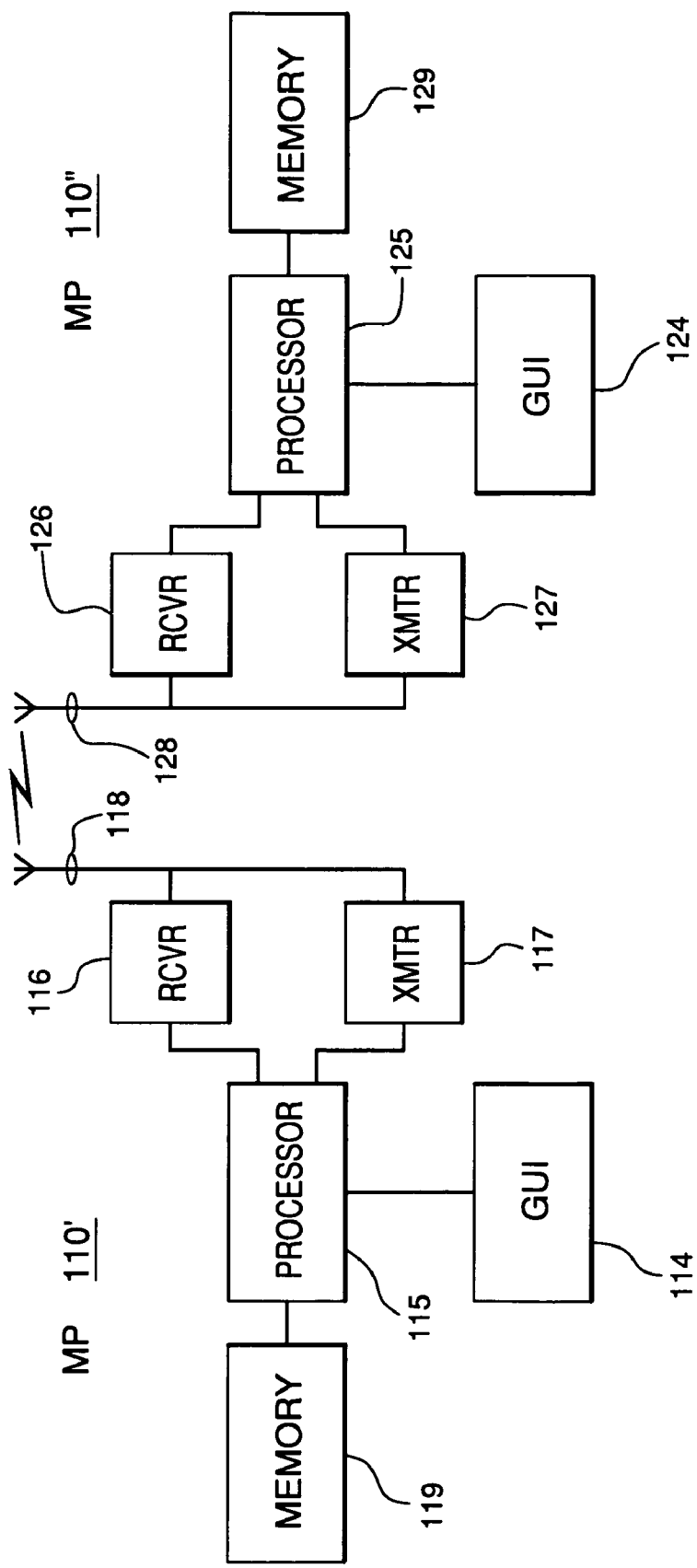
FIG. 2 shows a block diagram of a pair of mesh points (MPs) configured to perform a method of determining a level of involvement of MPs in the wireless communication system of FIG. 1.

FIG. 2 shows a block diagram of two MPs (designated as MP 110' and MP 110"), configured to share information and determine a level of involvement of MPs in the wireless communication system 100, in accordance with the present invention. For purposes of example, the MP 110' and the MP 110" are substantially similar units.

In addition to the nominal components included in a typical MP, the MP 110' includes a processor 115 configured to determine a level of involvement in the wireless communication system 100, a receiver 116 in communication with the processor 115, a transmitter in communication with the processor 115, a memory 119 in communication with the processor 115, a graphical user interface (GUI) 114 in communication with the processor 115, and an antenna 118 in communication with both the receiver 116 and the transmitter 117 to facilitate the transmission and reception of wireless data to and from the MP 110'.

In addition to the nominal components included in a typical MP, the MP 110" includes a processor 125 configured to determine a level of involvement in the wireless communication system 100, a receiver 126 in communication with the processor 125, a transmitter 127 in communication with the processor 125, a memory 129 in communication with the processor 125, a graphical user interface (GUI) 124 in communication with the processor 125, and an antenna 128 in communication with both the receiver 126 and the transmitter 127 to facilitate the transmission and reception of wireless data to and from the MP 110".

Figure 3:
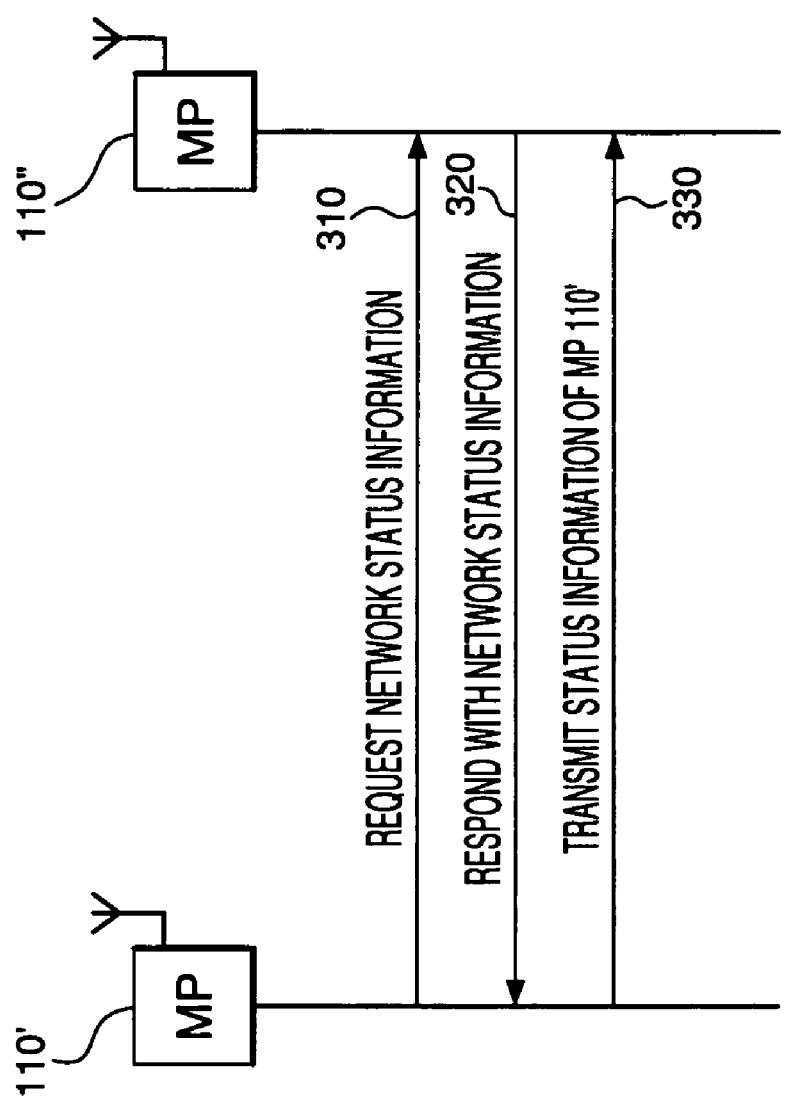
FIG. 3 shows a signal diagram of MPs communicating with one another to determine a level of involvement of MPs in the wireless communication system of FIG. 1, in accordance with the present invention.

FIG. 3 shows a signal diagram 300 between the MP 110' and the MP 110" for determining a level of involvement of MPs in the wireless communication system 100, in accordance with the present invention. In a preferred embodiment of the present invention, the processor 115 of the MP 110' transmits a request for network status information (310) through the transmitter 117 and the antenna 118 to the MP 110". The receiver 126 of the MP 110" receives the request (310) from the MP 110' via the antenna 128 and forwards it to the processor 125.

The processor 125 of the MP 110" then transmits a response (320), including the network status information, to the MP 110' via the transmitter 127 and the antenna 128. For purposes of example, the network status information may include information relating to the second MP 110" such as the availability of the second MP 110" for communication, the status of MPs 110 currently connected to the wireless communication system 100, the availability of connection to the external network 150 via any MP 110, the number of available MPs 110 connected to the wireless system, the current level of system activity, authentication required to connect to the wireless system, average or peak delays experienced in the wireless system, bandwidth availability, and the current level of confidentiality and encryption available in the wireless system.

The receiver 116 of the MP 110' receives the response (320) via the antenna 118 and forwards it to the processor 115. The processor 115 of the MP 110' is capable of displaying the network status information via the GUI 114 for the user of the MP 110'. Additionally, the processor 115 of the MP 110' is capable of determining and setting the level of involvement or availability in the wireless communication system 100, such as the number of MPs 110 that the first MP 110' is connected to, the quality of the connections such as packet loss rates, the current level of wireless activity, and the current level of service availability to other MPs 110 in the wireless communication system. For example, the MP 110' may be unavailable to other MPs 110, available for emergencies only, in part-time availability mode to save power, or may be fully available to other MPs 110 in the system.

The processor of 115 of the MP 110' may then transmit status information related to itself to the MP 110" via the transmitter 117 and antenna 118. The receiver 126 of the MP 110" receives the status information from the MP 110' via the antenna 128 and forwards it to the processor 125, which is capable of displaying the information via the GUI 124 for the user of the MP 110" and determining or setting the level of involvement or availability in the wireless communication system 100.

In a preferred embodiment of the present invention, the network status information and information related to the MP 110" is stored within the memory 129 of the MP 110" and is extracted by the processor 125 to transmit to the MP 110'. Likewise, the status information related to the MP 110' is stored within the memory 119 of the MP 110' and is extracted by the processor 115 to transmit to the MP 110". However, the status information may be stored and extracted by the processors 115 and 125, respectively, from additional areas with the MPs 110' and 110".

In an alternative embodiment of the present invention, rather than transmitting a request for network status information to additional MPs 110, the first MP 110' may passively monitor the wireless communication system 100 to receive network status information from other MPs 110 in the wireless communication system. In this manner, the processor 115 of the MP 110' passively receives network status signals from other MPs 110 through the receiver 116 and antenna 118. This network status information may be displayed on the GUI 114 by the processor 115 to the user of the MP 110'. Additionally, the processor 115 may transmit status information related to the MP 110' via the transmitter 117 and the antenna 118 to any other MP 110 in the wireless communication system.

Figure 4:
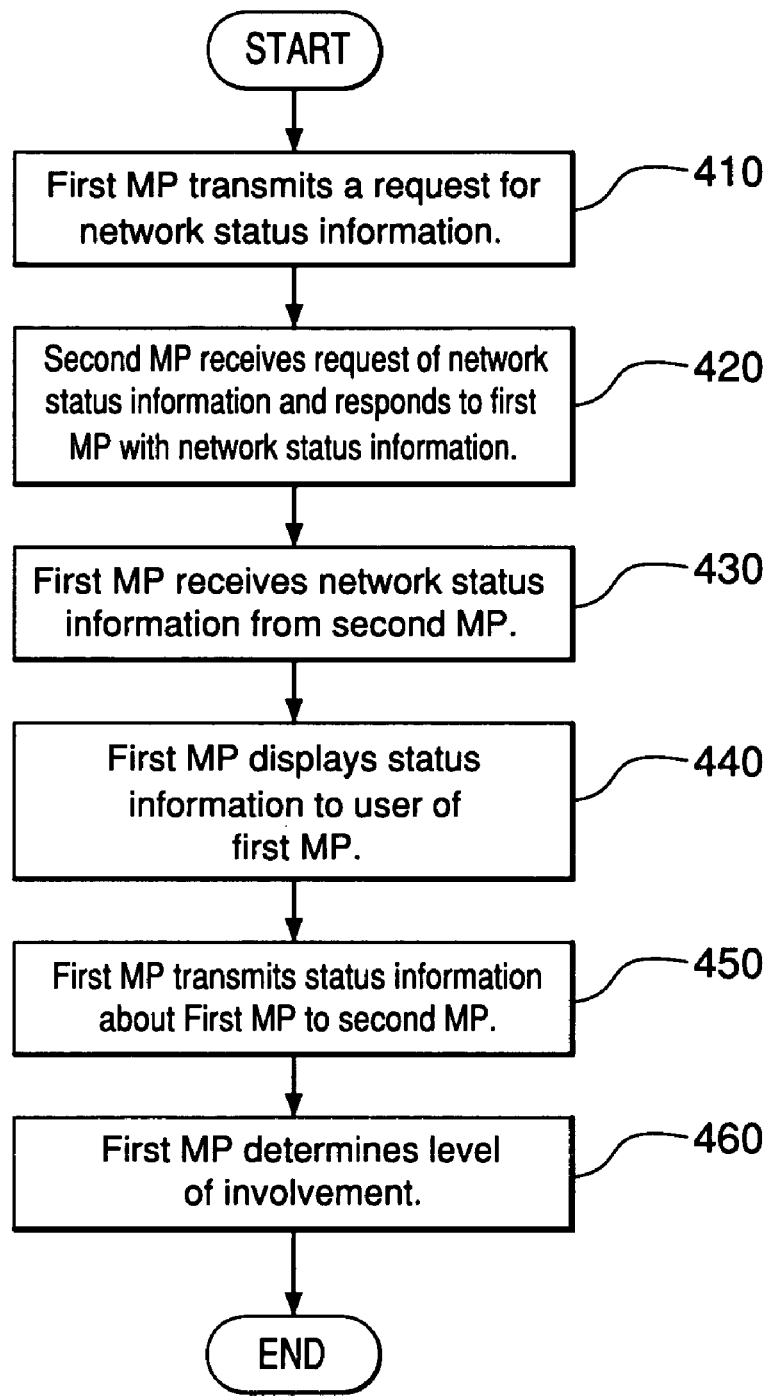
FIG. 4 is a flow diagram of a process of determining a level of involvement of MPs in a wireless communication system, in accordance with the present invention.

FIG. 4 is a flow diagram of a process 400 of determining a level of involvement of an MP 110 in the wireless communication system 100, in accordance with the present invention. In step 410, the first MP 110' transmits a request for network status information to other MPs 110 in the wireless communication system 100. Although any MP 110 may receive the request, for purposes of example, the second MP 110" will be described as responding to the first MP 110'. The second MP 110" receives the request and transmits network status information and information related to itself to the first MP 110' (step 420). In step 430, the first MP 110' receives the status information from the second MP 110".

The first MP 110' then displays the network status information received, along with other status information relating to the first MP 110' itself (step 440). Other status information such as power supply life and the like may also be displayed to the user of the MP 110'. The display may be implemented in a variety of manners, such as a graphical display for the user or a textual display.

If the user of the first MP 110' desires, the first MP 110' transmits its status information to the other MPs 110 in the wireless communication system (step 450). Additionally, the first MP 110' determines a level of involvement or availability in the wireless communication system (step 460). Since resource factors such as the amount of memory, processing resources, and battery consumption will affect the use of the MP 110, the MP 110 may desire either more involvement and availability in the wireless communication when resources are abundant, or less involvement and availability in the wireless communication system when resources are scarce.

The step of determining a level of involvement or availability in the wireless communication system (step 460) may be performed by the user of the first MP 110', by a wireless system operator, or by the first MP 110' itself, according to a pre-set configuration. Additionally, if the user of the MP 110' is the entity configuring the level of involvement or availability, then the user might require software or hardware configuration tools, such as applications running on the processor 115 of the MP 110' to allow the user to make the configuration changes. The configuration may be effected by the user via the GUI 114.

Alternatively, the wireless communication system operator or the manufacturer may remotely configure the MP 110' for its level of involvement and availability. This remote configuration may include pre-setting the unit by means of single inline module (SIM) cards, factory configuration, or remote semi-static settings through signaling frames and protocols at Layer 1 or Layer 2 to adjust the configuration of the MP 110' from remote locations, including locations external to the wireless communication system 100 such as from the external network 150. Similarly, the MP 110' may be configured to change its level of involvement on its own, depending on whether it is running on battery power or connected to an electrical power source. In all cases, the configuration parameters could be stored in read and write information elements stored in a database such as a management information database (MIB). The user or wireless communication system operator may monitor the configuration remotely or change the configuration by adjusting and retrieving elements in the database, for example using SMTP, XML, or the like.

The configuration may include settings as to whether or not the MP 110 is available for communication and, if so, the level of its availability. The level of availability may include only emergency routing, part-time connectivity, no packet forwarding, or full service availability for other MPs 110 in the wireless communication system. Furthermore, the configuration may include settings as to the amount of identifying information about the MP 110, and its current status and connections to other MPs 110 in the wireless communication system, and what type of authentication or encryption is required before the MP 110 will route or forward packets.

Figure 5A:
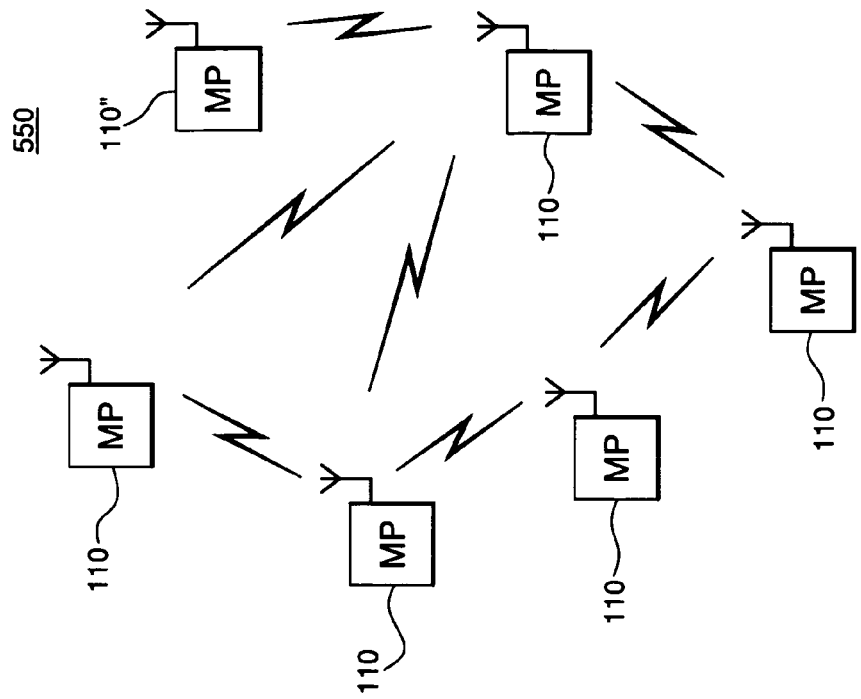
FIG. 5A shows a wireless communication system having an MP with a high degree of involvement in the wireless communication system.

FIG. 5A shows a wireless communication system 500 having an MP 110' with a high degree of involvement in the wireless communication system 500. In the wireless communication system 500, a plurality of MPs 110 are in wireless communication with one another to form the wireless communication system 500 and the MP 110' is in wireless communication with nearly every other MP 110 in the wireless communication system 500. Accordingly, the MP 110' may have a high traffic load being routed or forwarded through it, and MPs 110 requiring faster routing may desire to connect to MPs 110 with lower levels of involvement. Alternatively, MPs 110 connected to the MP 110' will have access to a greater variety of additional MPs 110 in the wireless communication system 500 due to the high degree of involvement of MP 110'.

Figure 5B:
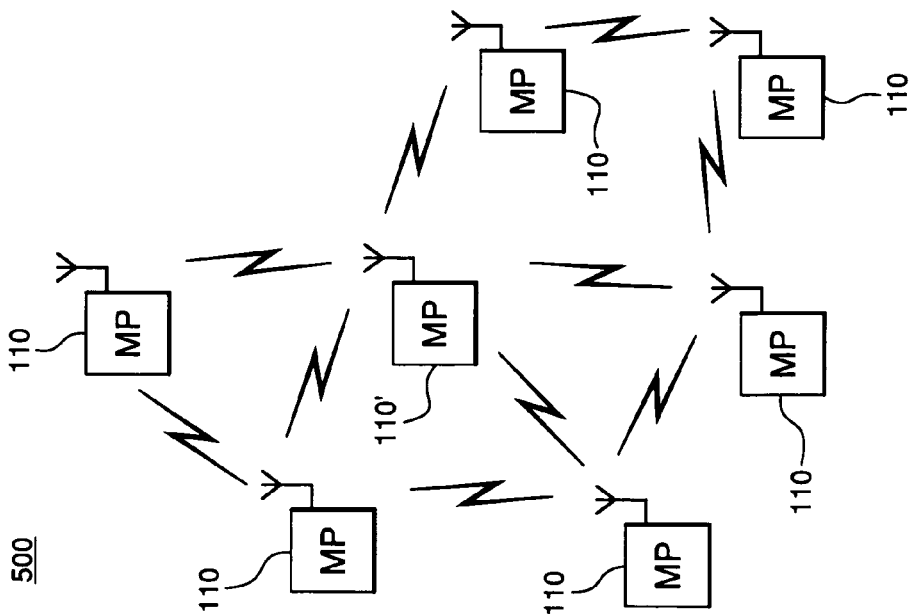
FIG. 5B shows a wireless communication system having an MP with a low degree of involvement in the wireless communication system.

FIG. 5B shows a wireless communication system 550 having an MP 110" with a low degree of involvement in the wireless communication system 550. In the wireless communication system 550, a plurality of MPs 110 are in wireless communication with one another to form the wireless communication system 550 and the MP 110" is only in wireless communication with one other MP 110 in the wireless communication system 550. Accordingly, the MP 110" may have lower traffic routing through it, and MPs 110 which connect to it may have faster routing of information through the MP 110". However, MPs 110 connected to the MP 110" will not have as convenient access to additional MPs 110 in the wireless communication system 550 where the MP 110" is not connected to.

The present invention may be implemented in any type of wireless communication system, as desired. By way of example, the present invention may be implemented in any type of 802.XX type system or any other type of wireless communication system. The present invention may be implemented in application software or DSP.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method implemented in a mesh point (MP) of a mesh network for use in wireless communication, the method comprising:
   the MP receiving information about a status of the mesh network from a neighbor mesh point (MP), wherein the information about the status of the mesh network includes an identification of the neighbor MP, a number of available MPs comprising the mesh network, and a level of involvement of the neighbor MP in the mesh network including at least one of bandwidth availability information, external network availability information, or an indication of an availability to transmit to other MPs of the mesh network; and
   the MP setting a level of involvement of the MP in the mesh network based on the information about the status of the mesh network.

2. The method of claim 1, wherein the information about the status of the mesh network indicates that the neighbor MP does not provide routing to the other MPs of the mesh network.

3. The method of claim 1, wherein the information about the status of the mesh network indicates that the neighbor MP provides limited routing.

4. The method of claim 1, wherein the information about the status of the mesh network indicates that the neighbor MP provides emergency routing.

5. The method of claim 1, wherein the information about the status of the mesh network indicates that the neighbor MP does not transmit path selection protocol messages and does not respond to path selection protocol messages.

6. A mesh point (MP) configured to operate in a mesh network, the MP comprising:
   a receiver configured to receive information about a status of the mesh network from a neighbor MP, wherein the information about the status of the mesh network includes a neighbor MP identification, a number of available MPs comprising the mesh network, and a level of involvement of the neighbor MP in the mesh network including at least one of bandwidth availability information, external network availability information, or an indication of an availability to transmit to other MPs of the mesh network; and
   a processor configured to set a level of involvement of the MP in the mesh network based on the information about the status of the mesh network.

7. The MP of claim 6, wherein the information about the status of the mesh network indicates that the neighbor MP does not provide routing to the other MPs of the mesh network.

8. The MP of claim 6, wherein the information about the status of the mesh network indicates that the neighbor MP provides limited routing.

9. The MP of claim 6, wherein the information about the status of the mesh network indicates that the neighbor MP provides emergency routing.

10. The MP of claim 6, wherein the information about the status of the mesh network indicates that the neighbor MP does not transmit path selection protocol messages and does not respond to path selection protocol messages.

* * * * *